Figure 1:
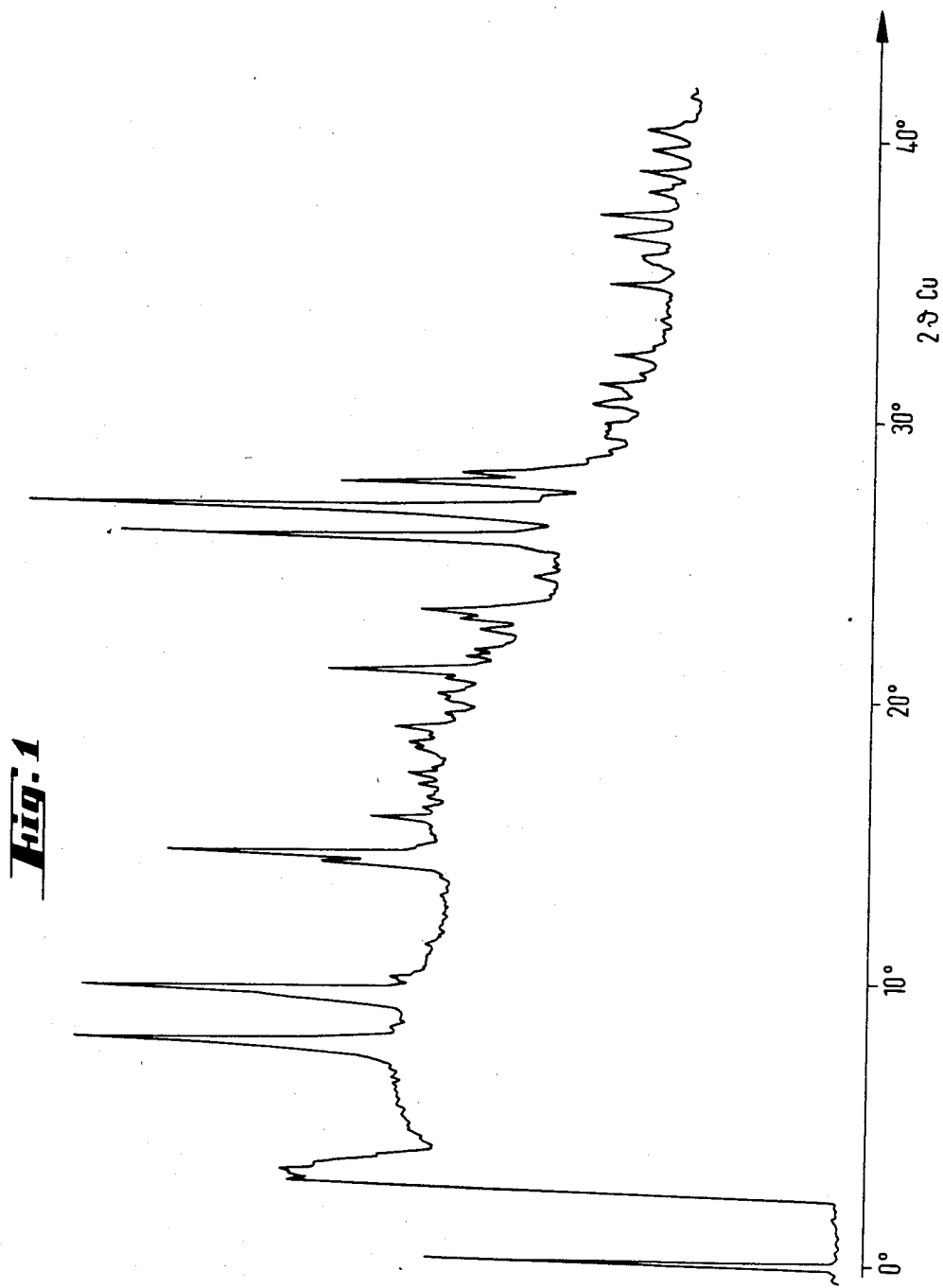

United States Patent [19]

Karlen et al.

[11] Patent Number: 4,550,178

[45] Date of Patent: Oct. 29, 1985

[54] DYE MIXTURE OF 1,4-DIAMINO ANTHRAQUINONE-N-GAMMA-METHOXY PROPYL-2,3-DICARBOXIMIDE AND 1,4-DIAMINO ANTHRAQUINONE-N-METHOXYETHOXY PROPYL-2,3-DICARBOXIMIDE, PROCESSES FOR PRODUCING IT, USEFUL FOR DYEING AND PRINTING HYDROPHOBIC FIBER MATERIALS.

[75] Inventors: Urs Karlen, Magden; Roland Putzar, Hofstetten; Rudolf Schaulin, Riehen, all of Switzerland

[73] Assignee: Ciba Geigy Corporation, Ardsley, N.Y.

[21] Appl. No.: 578,164

[22] Filed: Feb. 8, 1984

[30] Foreign Application Priority Data

Feb. 17, 1983 [CH] Switzerland ............... 893/83

[51] Int. Cl.[4] ............... C07D 487/00
[52] U.S. Cl. ............... 548/426; 106/288 Q; 8/453; 8/677; 8/921; 8/922
[58] Field of Search ............... 548/426; 106/288 Q

[56] References Cited

U.S. PATENT DOCUMENTS

| 2,628,963 | 2/1953 | Laucius et al. | 548/426 |
| 2,701,802 | 2/1955 | Boyd | 548/426 |
| 2,753,356 | 7/1956 | Laucius et al. | 548/423 |
| 3,294,815 | 12/1966 | Hartwig | 548/426 |

FOREIGN PATENT DOCUMENTS

| 2905653 | 8/1979 | Fed. Rep. of Germany | 548/426 |
| 3109951 | 9/1982 | Fed. Rep. of Germany | 548/426 |

Primary Examiner—Donald G. Daus
Assistant Examiner—Cecilia Shen
Attorney, Agent, or Firm—Edward McC. Roberts; Kevin T. Mansfield

[57] ABSTRACT

There are described dye mixed crystals consisting of 1 part of the dye of the formula

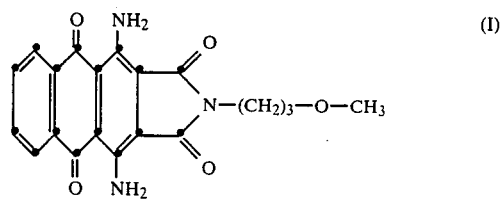

and 0.5–5 parts of the dye of the formula

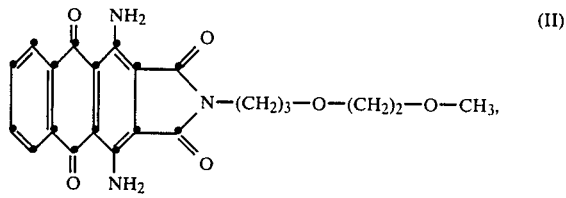

the production thereof, and their use for dyeing and printing hydrophobic fiber materials, particularly polyester materials. Blue dyeings having a good dye build-up are obtained.

1 Claim, 8 Drawing Figures

DYE MIXTURE OF 1,4-DIAMINO ANTHRAQUINONE-N-GAMMA-METHOXY PROPYL-2,3-DICARBOXIMIDE AND 1,4-DIAMINO ANTHRAQUINONE-N-METHOXYETHOXY PROPYL-2,3-DICARBOXIMIDE, PROCESSES FOR PRODUCING IT, USEFUL FOR DYEING AND PRINTING HYDROPHOBIC FIBER MATERIALS.

Subject matter of the present invention is a dye mixture which is in the form of homogeneous mixed crystals consisting of 1 part of the dye of the formula

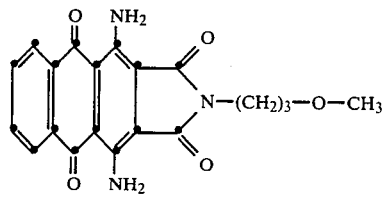 (I)

and 0.5–5 parts of the dye of the formula

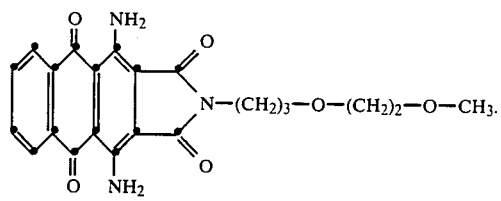 (II)

A preferred mixture ratio is 1 part of the dye I and 0.8 to 1.5 parts of the dye II.

The individual dyes of the formulae I and II are known (cp. for example: U.S. Pat. No. 2,753,356).

The individual dyes of the formulae I and II have poor build-up properties, and the physical mixture thereof is inadequately stable in dispersion. It was the object of the invention to provide a dye not having the stated disadvantages. The solution to this problem was found to be a dye mixture in the form of mixed crystals.

The mixed crystals of the said dye mixture are obtained by various methods, for example:

(a) by reacting the anthraquinone compound of the formula

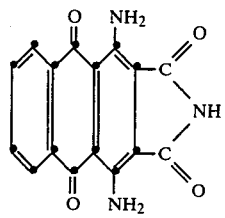 (III)

with a mixture of amines of the formulae

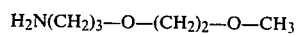 (IV)

and

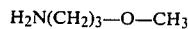 (V);

(b) by heating a mixture of the dyes of the formulae I and II in water or in an organic, water-soluble or water-insoluble solvent (for example chlorobenzene, xylene or trichloroethane) until a solution is obtained, and then allowing this to cool, in the course of which the dye mixture precipitates and can be filtered off; or (c) by reacting a dicyano compound of the formula

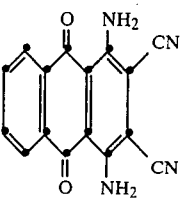 (VI)

with a mixture of compounds of the formulae

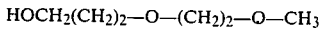 (VII)

and

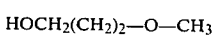 (VIII)

in concentrated sulfuric acid.

The reaction according to (a) is performed for example in a water-soluble organic solvent (for example alcohols, such as methanol, ethanol, glycol and in particular n-butanol), or in a water-insoluble organic solvent (for example benzene, mono-, di- and trichlorobenzene or 1,1,1-trichloroethane) at elevated temperature, advantageously below the boiling temperature of the solvent. An after-treatment of the reaction mixture is in some cases advisable; this is carried out for example by heating the reaction mixture in water at about 130° C. under pressure. A further possibility for the reaction of the anthraquinone compound III with the amines IV and V is to perform this in water above 100° C. under pressure. The aqueous suspension can in this case be produced by starting directly with the synthesis suspension and not isolating the dye mixture; or by isolating the dye mixture and subsequently suspending it in water. There is finally mentioned the possibility of using the amines IV and V as solvent per se, and reacting this at room temperature with the anthraquinone compound III.

All the starting materials of the formulae III to VIII are known and can be produced by known methods.

The resulting mixed crystals can be processed into the form of a dye preparation or of an aqueous, flowable suspension. Dispersing agents suitable for this purpose are especially dinaphthylmethanesulfonic acids, condensation products formed from m-cresol, formaldehyde and sodium bisulfite, as well as lignin sulfonates.

The mixed crystals according to the invention are suitable for dyeing hydrophobic fibers, such as synthetic linear polyesters, for example polyethylene glycol terephthalate, or polymers and semisynthetic fiber materials chemically synthesised in an analogous manner, such as cellulose triacetate, at temperatures of about 100° to 220° C.

Except where otherwise stated in the following Examples, the term 'parts' denotes parts by weight; and the abbreviation Rf signifies retention factor.

The X-ray diffraction pattern for FIG. 1 to FIG. 6 was taken with CuK-$\alpha$1 radiation ($\lambda = 1.5405$ Å). The calibration substance used was $\alpha$-quartz, the d-values of which are calculated from $a_o = 4.913$ Å and $c_o = 5.405$ Å.

Figure 7:
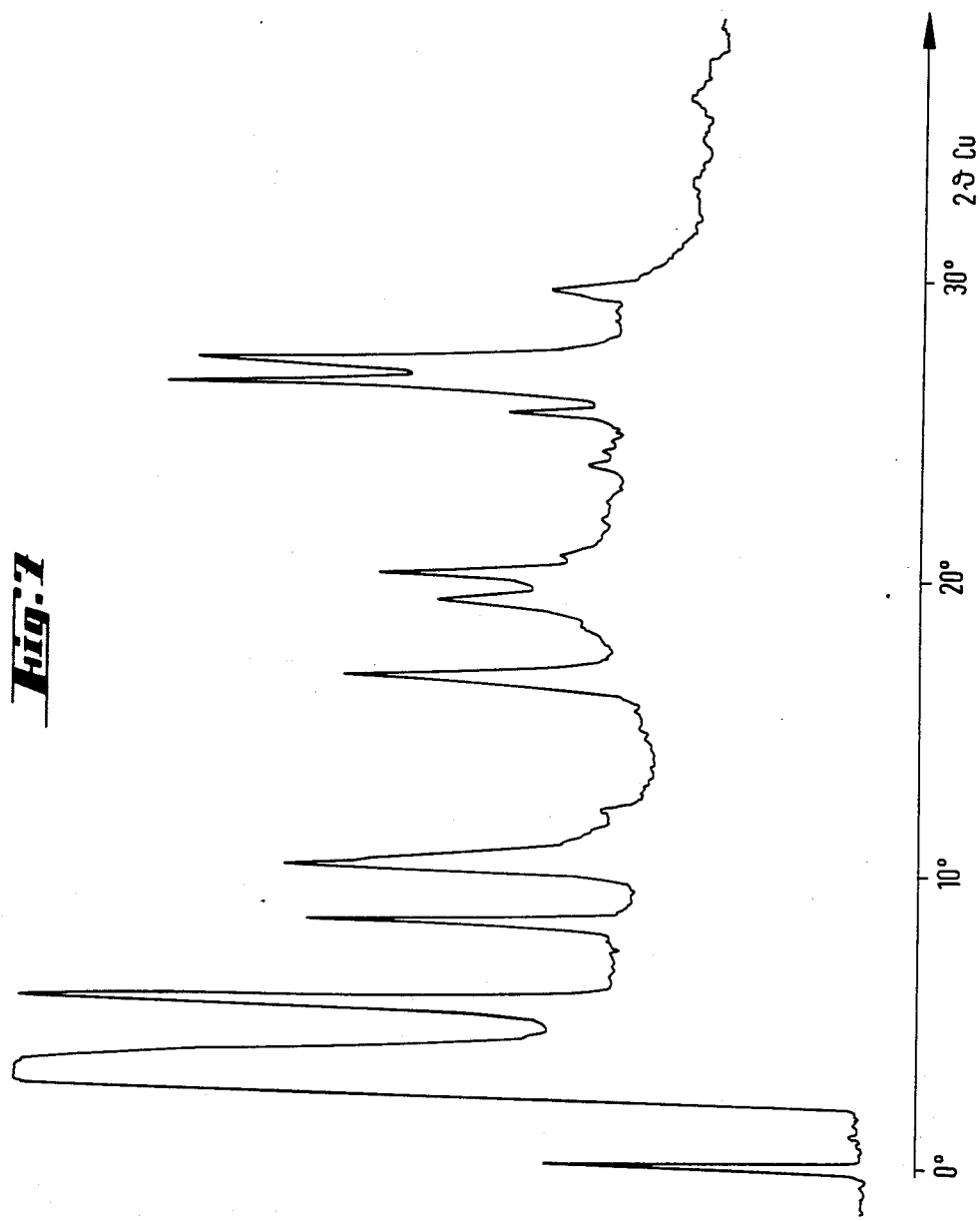
Figure 8:
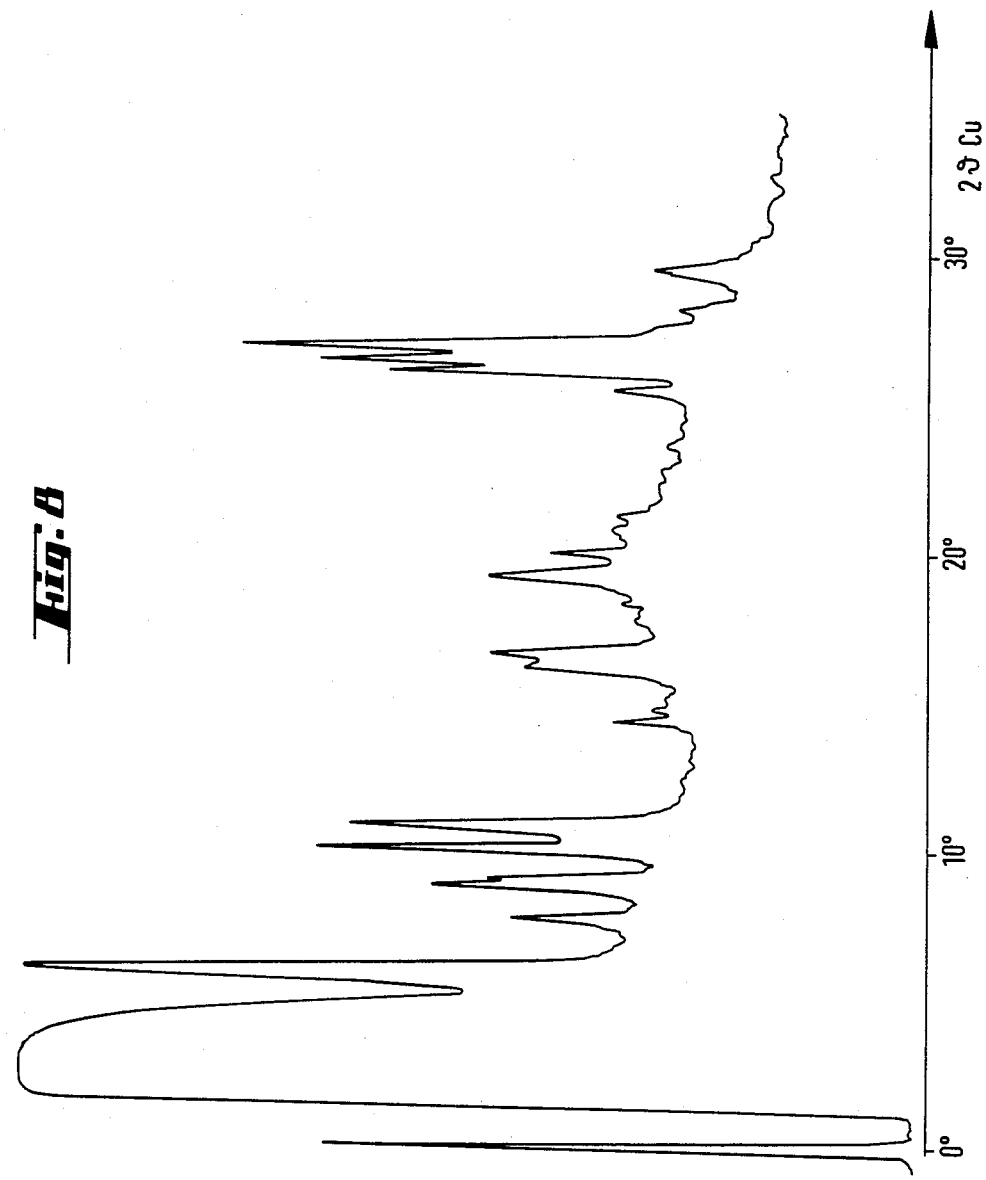

For FIG. 7 and FIG. 8, the X-ray diffraction pattern was taken with CuK-α radiation (λ=1.54178 Å).

The intensity is expressed in terms of five stages as follows:

| Stage | Intensity | Abbreviation |
| --- | --- | --- |
| 1 | very strong | vs |
| 2 | strong | s |
| 3 | medium | m |
| 4 | weak | w |
| 5 | very weak | vw |

EXAMPLE 1

The compound of the formula

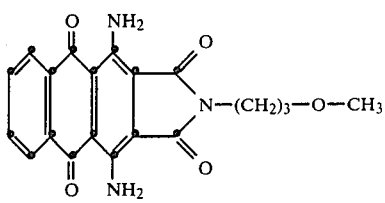

(I)

is obtained as follows:

170 parts of chlorobenzene are placed into a 350 ml sulfonating flask, and 61.4 parts of 100% 1,4-diamino-anthraquinone-2,3-dicarboxylic acid imide and 35.6 parts of 100% 3-methoxy-propylamine are added. The reaction mixture is heated with stirring to 115°–120° C., and is held there for 3 hours. As soon as the reaction mixture contains no further starting material, it is cooled to room temperature. The dye which has precipitated is filtered off, and the suction-filter residue is washed with 320 parts of methanol in portions. The residue is then washed with water until the discharge is colourless and neutral (about 1000 parts). There are obtained after drying at 90° C., 71 parts of the above compound as pure product having a melting point of 192°–194° C., which corresponds to a theoretical yield of 93%.

The X-ray diffraction diagram of the compound is illustrated in FIG. 1. There are given from this the following values:

| d(Å) | 11.7 | 9.4 | 6.4 | 6.2 | 5.68 | 4.70 | 4.25 | 3.85 | 3.48 | 3.35 | 3.23 | 3.19 |
| --- | --- | --- | --- | --- | --- | --- | --- | --- | --- | --- | --- | --- |
| Intensity | vs | vs | m | vs | m | m | s | m | vs | vs | s | m |

EXAMPLE 2

The compound of the formula

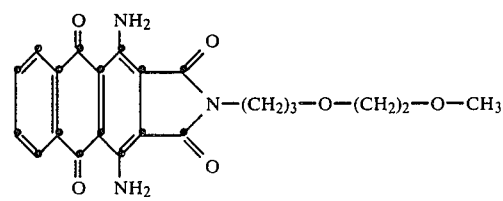

Figure 2:
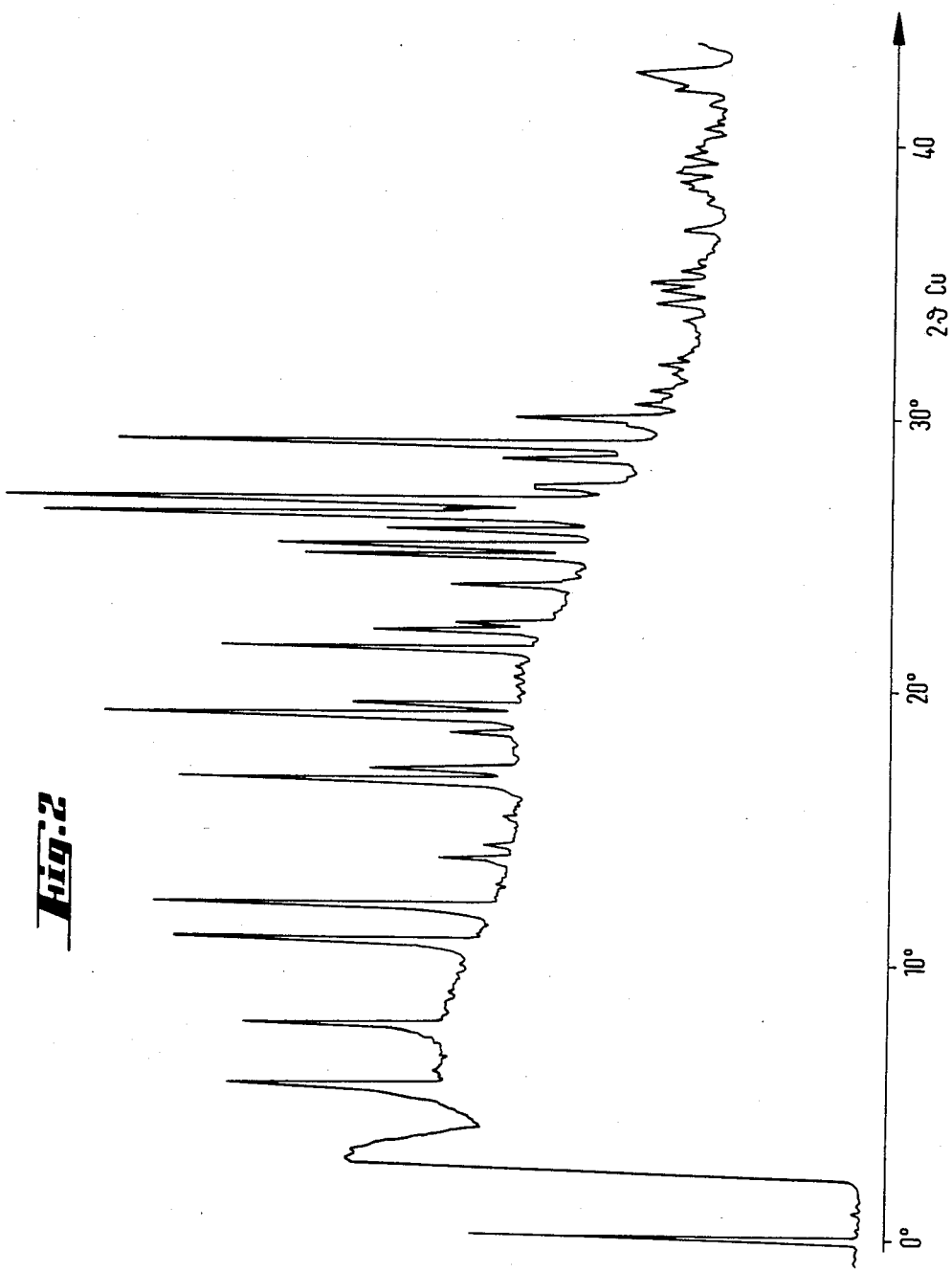

(II)

is obtained as follows:

170 parts of chlorobenzene are placed into a 350 ml sulfonating flask, and 61.4 parts of 100% 1,4-diamino-anthraquinone-2,3-dicarboxylic acid imide and 47.9 parts of 100% 3-(2-methoxyethoxy)-propylamine are added. The reaction mixture is heated with stirring to 115°–120° C., and is held there for 3 hours. When the reaction mixture contains no further starting material, it is cooled to room temperature. The dye which has precipitated is filtered off, and the suction-filter residue is washed with 320 parts of methanol in portions. The residue is then washed with water until the discharge is colourless and neutral (about 800 parts). There are obtained after drying at 90° C. 77 parts of the above compound as pure product having a melting point of 159°–161° C., which corresponds to a theoretical yield of 91%. The X-ray diffraction diagram of this compound is illustrated in FIG. 2. There are given from this the following values:

| d(Å) | 16.7 | 11.8 | 8.3 | 7.5 | 6.5 | 5.4 | 5.27 | 4.71 | 4.61 | 4.17 |
| --- | --- | --- | --- | --- | --- | --- | --- | --- | --- | --- |
| Intensity | s | s | s | s | m | s | m | s | m | s |

| d(Å) | 4.04 | 3.75 | 3.59 | 3.54 | 3.46 | 3.39 | 3.37 | 3.32 | 3.09 | 2.99 |
| --- | --- | --- | --- | --- | --- | --- | --- | --- | --- | --- |
| Intensity | m | m | s | s | s | vs | m | vs | vs | m |

EXAMPLE 3

490 parts of moist 50% aqueous 1,4-diamino-anthraquinone-2,3-dicarboxylic acid imide are suspended in 220 parts of an 0.25% aqueous dispersing-agent solution (condensation product of formaldehyde with the sodium salt of dinaphthylmethanedisulfonic acid). There is then added under pressure at 105° C., within 30 minutes, a mixture of 62 parts of 3-methoxy-propylamine and 94 parts of 3-(2-methoxy-ethoxy)-propylamine. The reaction mixture is subsequently stirred for 3 hours at 105° C. and for about 4 hours at 120° C. under an excess pressure of about 1.7 bar until no further starting material is detectable. After dilution with 310 parts of water, the reaction product is filtered off lukewarm under suction, and washed with hot water until the discharge liquid is practically colourless. There are obtained after drying 320 parts of the brilliant-blue dye mixture of the formulae

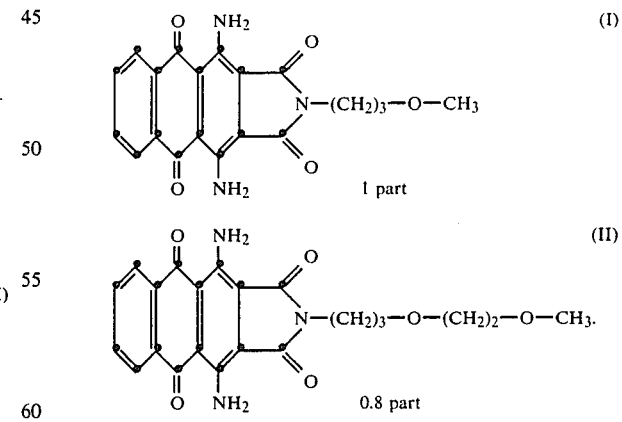

Figure 3:
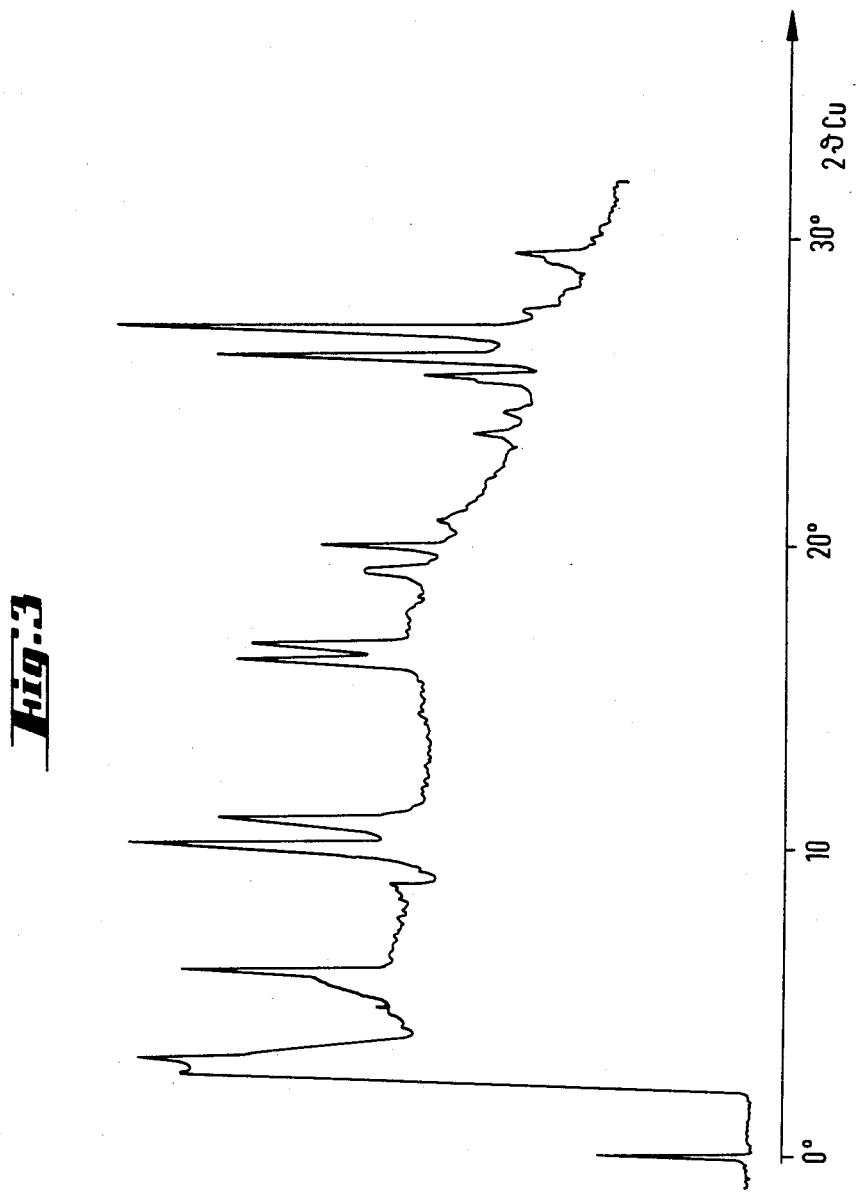

(The RF-values in the thin-layer chromatogram on a polygram SIL G layer in the eluant toluene:methanol 9:1 are 0.85 for the methoxy-propylamine derivative and 0.73 for the methoxy-ethoxypropylamine derivative.) The product melts at 175° C. FIG. 3 illustrates the X-ray diffraction diagram of this dye mixture, from which are given the following values:

| d(Å) | 15.1 | 8.8 | 8.2 | 5.52 | 5.35 | 4.66 diffuse | 4.47 | 3.43 | 3.31 | 3.03 |
|---|---|---|---|---|---|---|---|---|---|---|
| Intensity | s | vs | s | s | s | m | m | s | vs | m |

EXAMPLE 4

A mixture of 68 parts of 1,4-diamino- anthraquinone-2,3-dicarboxylic acid imide, 125 parts of n-butanol, 11 parts of 3-methoxy-propylamine and 53 parts of 3-(2-methoxy-ethoxy)-propylamine is heated within 1 hour to 118° C., with ammonia gas escaping from about 90° C. upwards. After approximately 4 hours at a reaction temperature of 118° C., practically no further starting material is detectable in the reaction mixture. The reaction product after cooling at a constant rate of cooling is filtered off with suction whilst still lukewarm, and is then washed with 500 parts of n-butanol and with 1200 parts of hot water. There are thus obtained, after drying, 80 parts of the pure, brilliant-blue dye mixture according to Example 3 with the following mixture ratio:
  component I: 1 part
  component II: 1.2 parts.
The product melts at 175° C.

Figure 4:
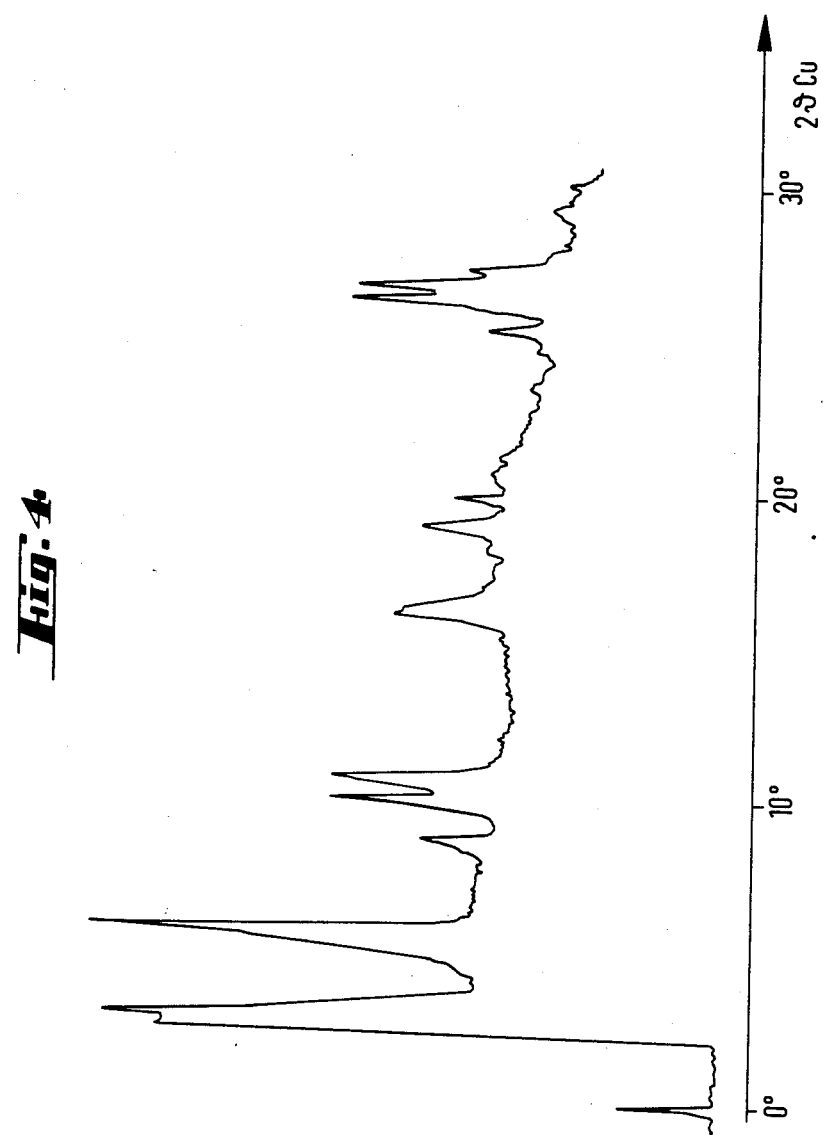

FIG. 4 illustrates the X-ray diffraction pattern of this dye mixture, from which are given the following values:

| d(Å) | 15.2 | 8.9 | 8.2 | 3.39 | 3.33 |
|---|---|---|---|---|---|
| Intensity | vs | m | m | s | s |

EXAMPLE 5

Figure 5:
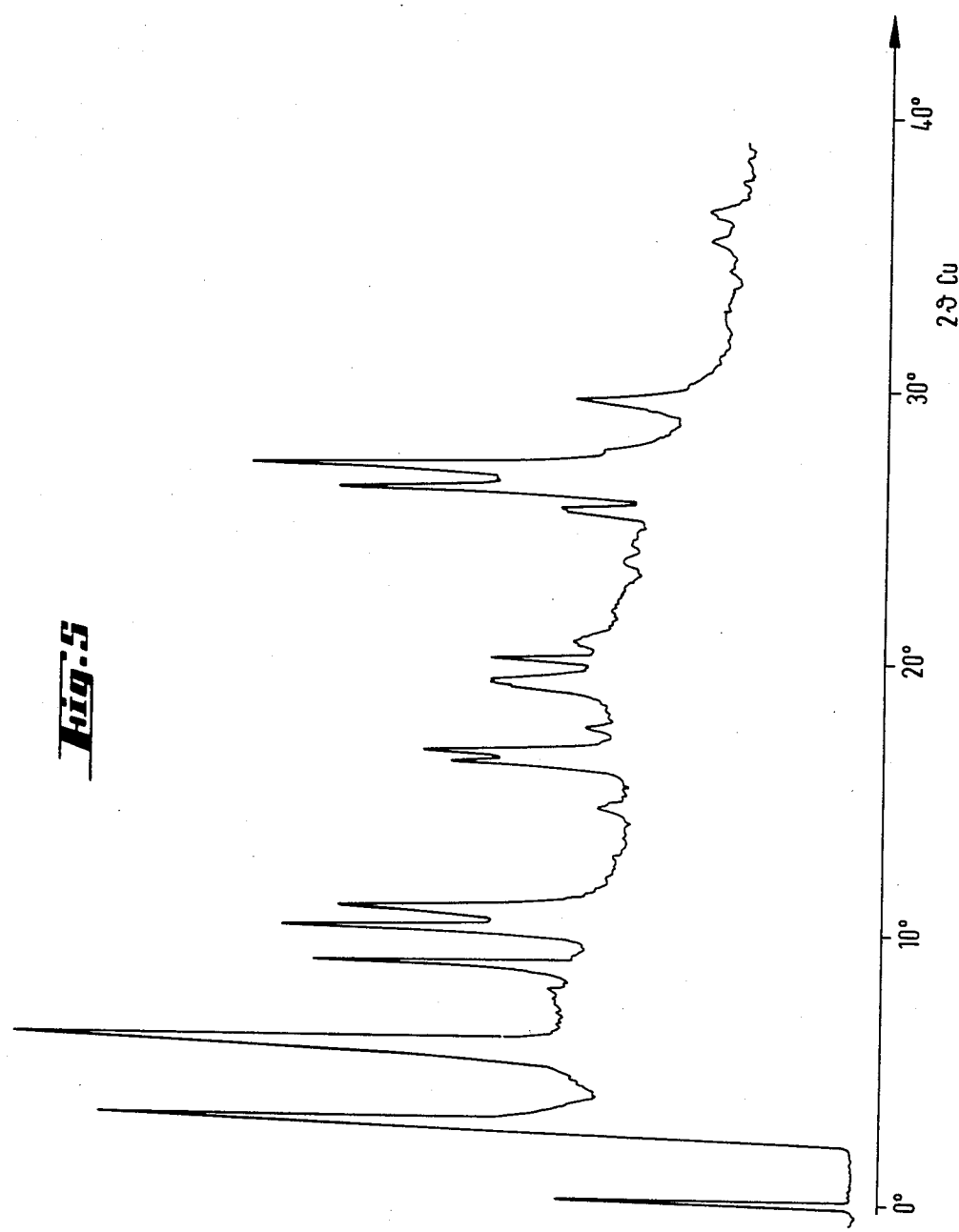

A mixture of 61 parts of 1,4-diamino- anthraquinone-2,3-dicarboxylic acid imide, 21 parts of 3-methoxy-propylamine, 48 parts of 3-(2-methoxy-ethoxy)-propylamine and 70 parts of water is heated within 2 hours to the reflux temperature of 98° C., ammonia gas beginning to escape from about 70° C. upwards. There are subsequently added 70 parts of water, and stirring is maintained for 2 hours at the reflux temperature. The reaction product is filtered off cold under suction, and is then washed with 200 parts of cold water and with 1000 parts of hot water until the discharge is colourless. After drying, there are thus obtained 77 parts of the pure, brilliant-blue dye mixture according to Example 3 with the following mixture ratio:
  component I: 1 part
  component II: 1.2 parts.
The product melts at 175° C. The X-ray diffraction pattern of the dye mixture obtained is illustrated in FIG. 5, from which are given the following values:

| d(Å) | 15.2 | 10.1 | 8.9 | 8.2 | 5.52 | 5.37 | 4.68 diffuse | 4.46 | 3.42 | 3.31 |
|---|---|---|---|---|---|---|---|---|---|---|
| Intensity | vs | m | s | m | m | m | m | m | s | vs |

EXAMPLE 6

Figure 6:
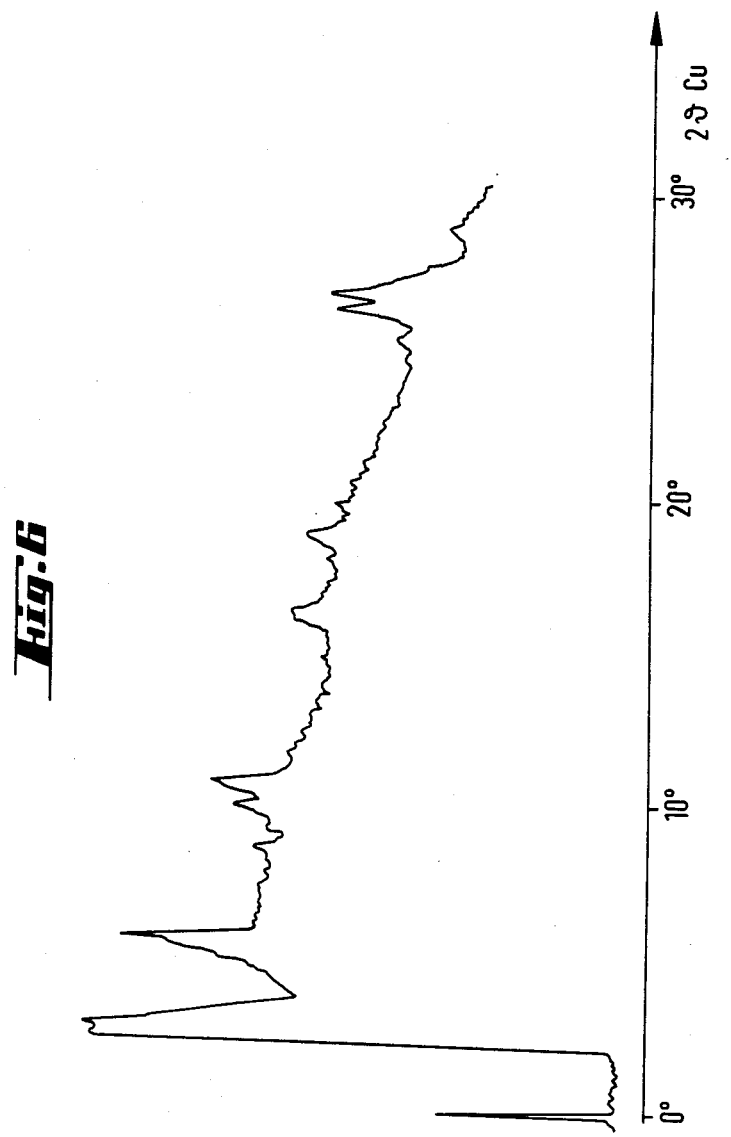

A mixture of 44 parts of 1,4-diamino- anthraquinone-2,3-dicarboxylic acid imide, 7.3 parts of 3-methoxy-propylamine, 16 parts of 3-(2-methoxy-ethoxy)-propylamine, 0.4 part of a dispersing agent (condensation product of formaldehyde with the sodium salt of dinaphthylmethanedisulfonic acid) and 135 parts of water is heated within 1 hour to 118° C., and the mixture is stirred at 118° C. under an excess pressure of 1.7 bar for about 8 hours until no further starting material is detectable. The reaction mixture is filtered off with suction whilst still lukewarm, and is then washed with 500 parts of hot water until the discharge liquid is colourless. After drying, there are thus obtained 57 parts of the brilliant-blue dye mixture according to Example 3 with the following mixture ratio:
  component I: 1 part
  component II: 1.5 parts.
The product melts at 173° C. The X-ray diffraction pattern of the resulting dye mixture is illustrated in FIG. 6, from which are obtained the following values:

| d(Å) | 15.4 | 8.9 | 8.2 | 3.40 | 3.33 |
|---|---|---|---|---|---|
| Intensity | vs | m | s | s | s |

EXAMPLE 7

A mixture of 140 parts of 1,4-diamino- anthraquinone-2,3-dicarboxylic acid imide, 340 parts of n-butanol, 26 parts of 3-methoxy-propylamine and 102 parts of 3-(2-methoxy-ethoxy)-propylamine is heated within 2 hours to 116° C., with ammonia gas escaping from about 90° C. upwards. After approximately 2 hours at the reflux temperature, no further starting material is detectable; the reaction product is subsequently filtered off whilst still lukewarm with suction, and is then washed with 2000 parts of n-butanol, 150 parts of cold water and 3000 parts of hot water until the discharge liquid is colourless. The moist press cake is afterwards suspended in 1000 parts of water and 18 parts of dispersing agent (condensation product of formaldehyde with the sodium salt of dinaphthylmethanedisulfonic acid), and the suspension is stirred for 24 hours at 132° C. under an excess pressure of 1.9 bar. The product is filtered off whilst still warm with suction, and washed with 1500 parts of hot water until the discharge liquid is colourless. After drying, there are thus obtained 170 parts of the brilliant-blue dye mixture according to Example 3 with the following mixture ratio:
  component I: 1 part
  component II: 5 parts.
The product melts at 170° C.

The X-ray diffraction pattern of the resulting dye mixture is illustrated in FIG. 7, from which is obtained the following values:

| d(Å) | 16.2 | 10.8 | 8.9 | 5.41 | 4.46 | 3.41 | 3.30 | 3.03 |
|---|---|---|---|---|---|---|---|---|
| Intensity | vs | s | s | s | m | vs | vs | m |

EXAMPLE 8

500 parts of chlorobenzene are placed into a 750 ml sulfonating flask; 65.19 parts of the compound of the formula I in the moist state (50 parts 100%) and 85.76 parts of the compound of the formula II in the moist state (50 parts 100%) are introduced, and rinsing is carried out with 50 parts of chlorobenzene. The suspension is then heated to 130° C., in the course of which water distills off, and at 130°–132° C. (reflux) the dye is dissolved. The temperature is lowered within 10 hours to 20°–30° C., the dye crystals which have precipitated are filtered off, and the chlorobenzene is removed by steam distillation. After renewed filtration and drying at 90° C., the yield is 96.2 parts of the dye mixture according to Example 3, the components I and II being present in the ratio of 1:1

The X-ray diffraction pattern of the resulting dye mixture is illustrated by FIG. 8, from which are obtained the following values:

| d(Å) | 15.1 | 10.1 | 8.9 | 8.2 | 5.50 | 5.35 | 4.65 | 3.42 | 3.37 | 3.31 |
|---|---|---|---|---|---|---|---|---|---|---|
| Intensity | vs | m | s | s | m | m | m | m | s | vs |

EXAMPLE 9

10 parts of one of the dye mixtures produced according to Examples 3-8 are ground, with the addition of 5 parts of a condensation product of a naphthalene-sulfonic acid with formaldehyde, in 60 parts of water by means of a glass-ball mill until an adequately fine distribution is obtained. There are subsequently added 15 parts of a hydroxylignin sulfonate, and the whole is dried in a spray apparatus.

In a pressure dyeing apparatus, 40 parts of the resulting dye granulate are suspended in 40 parts of water at 70° C. containing 4 parts of an oleyl polyglycol ether. The pH-value of the dye bath is adjusted to 4 to 5 with acetic acid. A wound package consisting of 2000 parts of polyethylene glycol terephthalate yarn is then dyed therewith by raising the temperature of the dye bath within 30 minutes from 70° to 130° C. and holding the bath at this temperature for 50 minutes. The result after the customary finishing of the dyeing is a wound package levelly dyed in an intense brilliant-blue shade.

What is claimed is:

1. Homogeneous mixed crystals of a dye mixture consisting of 1 part of the dye of the formula

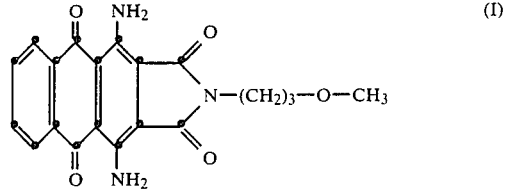

and 0.5–5 parts of the dye of the formula

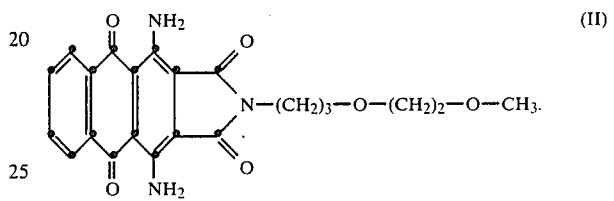

* * * * *